(12) United States Patent  
Sievers

(10) Patent No.: US 9,438,928 B2  
(45) Date of Patent: Sep. 6, 2016

(54) MECHANISM FOR VIDEO ENCODING BASED ON ESTIMATES OF STATISTICALLY-POPULAR MOTION VECTORS IN FRAME

(71) Applicant: LIFESIZE, INC., Austin, TX (US)

(72) Inventor: John C. Sievers, Lynnfield, MA (US)

(73) Assignee: LIFESIZE, INC., Austin, TX (US)

( * ) Notice: Subject to any disclaimer, the term of this patent is extended or adjusted under 35 U.S.C. 154(b) by 472 days.

(21) Appl. No.: 13/957,269

(22) Filed: Aug. 1, 2013

(65) Prior Publication Data

US 2014/0126638 A1  May 8, 2014

Related U.S. Application Data

(60) Provisional application No. 61/722,524, filed on Nov. 5, 2012, provisional application No. 61/725,343, filed on Nov. 12, 2012.

(51) Int. Cl.

| | |
|---|---|
| *H04N 19/567* | (2014.01) |
| *H04N 19/52* | (2014.01) |
| *H04N 19/57* | (2014.01) |
| *H04N 19/51* | (2014.01) |
| *H04N 19/513* | (2014.01) |

(52) U.S. Cl.  
CPC ............ *H04N 19/567* (2014.11); *H04N 19/51* (2014.11); *H04N 19/513* (2014.11); *H04N 19/52* (2014.11); *H04N 19/57* (2014.11)

(58) Field of Classification Search  
CPC .... H04N 19/57; H04N 19/567; H04N 19/51; H04N 19/513; H04N 19/52  
See application file for complete search history.

(56) References Cited

U.S. PATENT DOCUMENTS

| | | | |
|---|---|---|---|
| 2006/0002472 A1* | 1/2006 | Mehta ................... | G06T 7/2013 375/240.16 |
| 2007/0237232 A1* | 10/2007 | Chang ................. | H04N 19/192 375/240.16 |

OTHER PUBLICATIONS

Chang, M. M., Takalp, A. M., & Sezan, M. I.; "Simultaneous Motion Estimation and Segmentation"; IEEE Transactions on Image Processing, vol. 6, No. 9; Sep. 1997, pp. 1326-1333.

(Continued)

*Primary Examiner* — Robert Hance  
(74) *Attorney, Agent, or Firm* — Meyertons Hood Kivlin Kowert & Goetzel, P.C.; Jeffrey C. Hood; Mark K. Brightwell

(57) ABSTRACT

A mechanism for performing a motion vector search at a current block within a current frame of video data. For each test vector position v of a plurality of test vector positions, compute a rate distortion value $J(v)$ based on a combination of a distortion value $D(v)$ and a bit cost value $R(v,p,C)$. The distortion value $D(v)$ represents a measure of distortion of the current block relative to a corresponding block $B_v$ in the reference frame. The bit cost value $R(v,p,C)$ depends on the test vector position v, a prediction vector p for the current block and a set C of one or more vectors $c_1, c_2, \ldots, c_n$. The one or more vectors $c_1, c_2, \ldots, c_n$ are estimates (or predictions) of statistically-popular motion vectors for the current frame. The test vector position $v^*$ that gives a minimum rate-distortion value $J(v^*)$ is selected as the motion vector for the current block.

17 Claims, 7 Drawing Sheets

(56) References Cited

OTHER PUBLICATIONS

Tibshirani, R. J.; "Fast Computation of the Median by Successive Binning"; The Computing Research Repository (CoRR); abs/0806.3301; Jun. 20, 2008; 14 pages.

Wiegand, T., Schwarz, H., Joch, A., Kossentini, F., & Sullivan, G. J.; "Rate-Constrained Coder Control and Comparison of Video Coding Standards"; IEEE Transactions on Circuits and Systems for Video Technology; vol. 13, No. 7; Jul. 2003; pp. 688-703.

Wiegand, T., Steinbach, E., & Girod, B.; "Aline Multipicture Motion-Compensated Prediction"; IEEE Transactions on Circuits and Systems for Video Technology; Feb. 2005; pp. 197-209.

Software, R. F.; "Origin of Quake3's Fast InvSqrt()"; Published Nov. 29, 2006; Last Updated Mar. 21, 2007; Retrieved Oct. 14, 2014 from Beyond 3D:http://www.beyond3d.com/content/articles/8/; 6 pages.

Chung, W. C., & Kossentini, F. & Smith, M.J.T.; "An Efficient Motion Estimation Technique Based on a Rate-Distortion Criterion"; Proceedings of the Acoustics, Speech, and Signal Processing, vol. 4; May 7-10, 1996; pp. 1926-1929.

Glantz, A., Krutz, A., & Sikora, T: "Adaptive Global Motion Temporal Prediction for Video Coding"; Picture Coding Symposium (PCS) 2010; Dec. 8-10, 2010; pp. 202-205.

Hsieh, C., Lu, P., Shyn, J., & Lu, E.; "Motion Estimation Algorithm Using Interblock Correlation"; Electronics Letters, vol. 26, Issue 5; Mar. 1, 1990; pp. 276-277.

Kamp, S., Evertz, M., & Wien, M.; "Decoder Side Motion Vector Derivation for Inter Frame Coding"; IEEE International Conference on Image Processing; Oct. 12-15, 2008; pp. 1120-1123.

Kossentini, F., Lee, Y., Smith, M.J.T., & Ward, R.K.; "Predictive RD Optimized Motion Estimation for Very Low Bit-Rate Video Coding"; IEEE Journal on Selected Areas in Communications, vol. 15, Issue 9; Dec. 1997; pp. 1752-1763.

Stiller, C., & Konrad, J.; "Estimating Motion in Image Sequences"; IEEE Signal Processing Magazine, vol. 16, Issue 4; Jul. 1999; pp. 70-91.

Sullivan, G. J., & Wiegand, T.; "Rate-Distortion Optimization for Video Compression"; IEEE Signal Processing Magazine, vol. 15, Issue 6; Nov. 1998; pp. 74-90.

Sullivan, G. J., Ohm, J.-R., Han, W.-J., & Wiegand, T.; Overview of the High Efficiency Video Coding (HEVC) Standard; IEEE Transactions on Circuits and Systems for Video Technology, vol. 22, Issue 12; Dec. 2012; pp. 1649-1668.

Wiegand, T. & Girod, B.; "Lagrange Multiplier Selection in Hybrid Video Coder Control"; 2001 International Conference on Image Processing, vol. 3; Oct. 7-10, 2001; pp. 542-545.

Girod, B.; "Rate-Constrained Motion Estimation"; Visual Communications and Image Processing, SPIE 2308; Sep. 16, 1994; pp. 1026-1034.

\* cited by examiner

300 encode a current frame of the frame sequence with respect to a reference frame of the frame sequence, where the action of encoding the current frame includes sequentially processing a plurality of blocks of the current frame according to an ordering of the blocks, where the action of processing a current block includes performing a motion vector search for the current block over a plurality of test vector positions, where the action of performing the motion vector search includes: 310 for each test vector position v of the plurality of test vector positions, computing a rate distortion value J(v) based on a linear combination of a distortion value D(v) and a bit cost value R(v,p,C), where the distortion value D(v) represents a measure of distortion of the current block $B_v$ relative to a corresponding block in the reference frame, where the corresponding block $B_v$ has a position in the reference frame that is defined by the test vector position v and a position of the current block in the current frame, where the bit cost value R(v,p,C) depends on the test vector position v, a prediction vector p for the current block and a set C of one or more vectors $c_1, c_2, \ldots, c_n$, where the predetermined vectors $c_1, c_2, \ldots, c_n$ are estimates of statistically-popular motion vectors for the current frame 315 selecting a test vector position v* from the plurality of test vector positions that gives a minimum rate-distortion value 320

> encode a frame of the frame sequence with respect to m reference frames of the frame sequence, where m is greater than one, where the action of encoding the frame includes sequentially processing a plurality of blocks of the frame according to an ordering of the blocks, where the action of processing a given block of the frame includes performing a motion vector search for the block over a search space of m-tuples $(v_1, v_2, ..., v_m)$, where each vector $v_k$, k=1, 2, ..., m, of the m-tuple $(v_1, v_2, ..., v_m)$ is a candidate motion vector for the block with respect to a $k^{th}$ one of the reference frames, where the motion vector search includes: 410
>
>> for each m-tuple of the search space, computing a bit cost value $R(v_k,p,E)$ for each vector $v_k$ in the m-tuple, where the bit cost value $R(v_k,p,E)$ depends on vector $v_k$, a prediction vector p for the block, and a vector set E, where the vector set E includes one or more vectors from a set $\{e_1, e_2, ..., e_L\}$, where the vectors $e_1, e_2, ..., e_L$ are estimates of the L most statistically-popular motion vectors of the frame   315

> encode a frame of the frame sequence with respect to m reference frames of the frame sequence, where m is greater than one, where the action of encoding the frame includes sequentially processing a plurality of blocks of the frame according to an ordering of the blocks, where the action of processing a given block of the frame includes performing a motion vector search for the block over a search space of m-tuples $(v_1, v_2, ..., v_m)$, where each vector $v_k$, k=1, 2, ..., m, of the m-tuple $(v_1, v_2, ..., v_m)$ is a candidate motion vector for the block with respect to a $k^{th}$ one of the reference frames, where the motion vector search includes:   510
>
>> for each m-tuple of the search space, (a) computing a rate distortion value $J(v_k) = D_k(v_k)+R(v_k,p,E)$ for each vector $v_k$ in the m-tuple, where $D_k(v_k)$ is a distortion value of the block based on the $k^{th}$ reference frame and the vector $v_k$, where $R(v_k,p,E)$ is a bit cost value that depends on vector $v_k$, a prediction vector p for the block, and a vector set E, where the vector set E includes one or more vectors from a set $\{e_1, e_2, ..., e_L\}$, where the vectors $e_1, e_2, ..., e_L$ are estimates of the L most statistically-popular motion vectors of the frame, and (b) determining the index $k_{min}$ of the vector $v_{kmin}$ in the m-tuple that gives the minimum value M of the distortion values $J(v_k)$   515
>
>> determine an m-tuple $T^*$ of the search space that gives a minimum value $M^*$ of M, wherein the vector $v_{kmin}$ corresponding to the m-tuple $T^*$ is selected as a motion vector for the block   520

FIG. 5

MECHANISM FOR VIDEO ENCODING BASED ON ESTIMATES OF STATISTICALLY-POPULAR MOTION VECTORS IN FRAME

PRIORITY CLAIM DATA

This application claims the benefit of priority to U.S. Provisional Application No. 61/722,524, filed on Nov. 5, 2012, entitled "Low-Complexity Ad-Hoc Global Motion for Low Bitrate Coding", invented by John C. Sievers, and to U.S. Provisional Application No. 61/725,343, filed on Nov. 12, 2012, entitled "Low-Complexity Ad-Hoc Global Motion for Low Bitrate Coding", invented by John C. Sievers. Both of the above-named Provisional Applications are hereby incorporated by reference in their entireties as though fully and completely set forth herein.

FIELD OF THE DISCLOSED EMBODIMENTS

The present application relates generally to the field of digital video encoding, and more particularly, to a mechanism for encoding a frame of video data using estimates (or predictions) of the motions vectors of respective blocks in the frame.

DESCRIPTION OF THE RELATED ART

Video coding attempts to achieve a balance between two competing factors. It is desirable to encode video in such a manner that the visual quality of the video will not be compromised upon subsequent decode and display. However, it is also important in many situations for the encoded bit stream to have a low bit rate, in order to transmit the encoded bit stream through a band-limited channel. Visual quality and bit rate are typically opposing factors. (Increasing one tends to decrease the other.)

Video encoding operates on a sequence of frames (images). Each frame may be encoded relative to a reference frame. For each block in a given frame, a search is performed to determine an optimal motion vector for the block. The search may involve minimizing a rate distortion function J with respect to motion vector v. The motion vector v varies over a search range, e.g., a rectangular region centered at (0,0). The rate distortion function J may have the form $$J(v)=D(v)+\lambda R(v,p),$$

where $\lambda$ is a positive scalar value. $D(v)$ is a distortion function that measures the distortion of the current block relative to a corresponding block $B_v$ of the reference frame. The corresponding block $B_v$ has a position in the reference frame that is defined by the test vector v and the position of the current block in the current frame. $R(v,p)$ is a rate cost function that measures the number of bits that will be required to transmit the vector difference v−p, where p is a prediction vector for the current block. The number of required bits is typically an increasing function of the distance $\|v-p\|$. (The prediction vector p may be obtained by any of various known means. For example, the prediction vector may be a motion vector that has already been selected for one of the blocks temporally or spatially neighboring the current block, or a combination of motion vectors that have already been selected for two or more neighboring blocks.) When $\lambda$ is small, the search emphasizes more the minimization of distortion than the minimization of bit rate. A frame whose motion vectors are chosen on the basis of J minimization with small $\lambda$ may exhibit high visual quality upon decode and display. Conversely, when $\lambda$ is large, the search emphasizes more the minimization of bit rate than the minimization of distortion. Thus, the motion vectors generated for the respective blocks of the current frame will exhibit spatial inertia, i.e., the tendency to avoid radical changes between neighboring blocks of the frame. (The strong emphasis on bit rate minimization means that it is very costly to allow the difference v−p to be large.) Large changes in the motion vector may be limited to situations where the distortion measure $D(v)$ would be large if the difference v−p were small in magnitude. A frame whose motion vectors are chosen on the basis of J minimization with larger $\lambda$ may exhibit higher compression ratio but lower visual quality.

One problem that arises in the context of encoding a frame at larger values of $\lambda$ is due to the fact that the rate cost function $R(v,p)$ only incorporates local information in the form of the prediction vector p. (The prediction vector p is derived from one or more motion vectors for blocks near the current block.) When the motion vector for the current block is selected based on minimization of the rate distortion function $J(v)$, that motion vector may be far from globally optimal. For example, if a frame contains a large object translating across a background, and the current block is just inside the object and at the top left of the object, it would be desirable to select for the current block a motion vector that is consistent with the motion of the object. If that desirable selection were made, many of the following blocks, which are further inside the object, could be skip coded at essentially zero bit cost because all the blocks of the object move with the same translational velocity, and, as a general principle, the motion vector selection for any given block is very likely to become the prediction vector for one or more succeeding blocks in the raster processing order. (The number of bits required to signal the condition that the motion vector for a block is the same as the prediction vector for that block is zero or very small. The decoder may be programmed to assume that the motion vector of the generic block is identical to the prediction vector unless otherwise specified by the transmitted bit stream.) However, because $\lambda$ is large, the selection of motion vector for the current block is strongly biased towards maintaining continuity with the prediction vector p, which is very likely based on a block outside the object, in the background. If the object is highly textured, the distortion measure $D(v)$ will be sensitive to significant departures of the argument vector v from the true motion of the object, and thus, will serve as a counterbalance to the tendency to maintain motion vector continuity. The selected motion vector may be closer to the true motion vector of the object than the motion vector selected for the previous block. In contrast, if the object is smooth (or not highly textured) near its boundary, the tendency to maintain motion vector continuity may be more pronounced. Thus, the motion vector search for the current block may be locally optimal in the sense of optimizing the rate distortion function $J(v)$, but globally non-optimal. There exists a need for video encoding mechanisms capable of addressing this problem.

SUMMARY

In one set of embodiments, a method for encoding video data may perform as follows. A processing agent may encode a current frame of a frame sequence with respect to a reference frame of the frame sequence. The action of encoding the current frame includes sequentially processing a plurality of blocks of the current frame according to an ordering of the blocks (e.g., a raster ordering). The action of processing a current block includes performing a motion vector search for the current block over a plurality of test vector positions.

The motion vector search for the current block may include: for each test vector position v of the plurality of test vector positions, computing a rate distortion value $J(v)$ based on a linear combination of a distortion value $D(v)$ and a bit cost value $R(v,p,C)$. The distortion value $D(v)$ represents a measure of distortion of the current block relative to a corresponding block $B_v$ in the reference frame. The corresponding block $B_v$ has a position in the reference frame that is defined by the test vector position v and a position of the current block in the current frame. The bit cost value $R(v,p,C)$ depends on the test vector position v, a prediction vector p for the current block and a set C of one or more vectors $c_1, c_2, \ldots, c_n$, where n is a positive integer. The one or more vectors $c_1, c_2, \ldots, c_n$ may be estimates (or predictions) of statistically popular motion vectors for the current frame. The bit cost value $R(v,p,C)$ may include a combination of a direct local cost and an expected future benefit. The direct local cost may be an increasing function of the distance $\|v-p\|$. The expected future benefit may be a function of the distances $$\{\|v-c_j\|: j=1,2,\ldots,n\}.$$

In some embodiments, the bit cost value $R(v,p,C)$ is determined by evaluating a function of distance $\|v-p\|$ and distances $\{\|v-c_j\|: j=1, 2, \ldots, n\}$, e.g., a function of the form:

$$R(v,p,C)=R_0(\|v-p\|)-\Delta R(\|v-c_1\|,\|v-c_2\|,\ldots,\|v-c_n\|),$$

where $R_0$ is a conventional bit rate cost function, e.g., a bit rate cost function as defined by any of a variety of existing video coding standards, where $\Delta R$ is a function that represents the expected future benefit for choosing the vector v as the motion vector for the current block. In one embodiment, the expected future benefit function $\Delta R$ may also include a dependency on the distance $\|v-p\|$, i.e., $$R(v,p,C)=R_0(\|v-p\|)-\Delta R(\|v-c_1\|,\|v-c_2\|,\ldots,\|v-c_n\|,\|v-p\|).$$

The motion vector search for the current block may also include selecting a test vector position v* from the plurality of test vector positions such that the test vector position v* gives a minimum rate-distortion value:

$$v^*=\arg\min J(v).$$

Having knowledge of the statistically-popular motion vectors $c_1, c_2, \ldots, c_n$ means that the rate distortion function $J(v)$ can incorporate information regarding the expected future benefit associated with selecting the vector v as the motion vector for the current block. Thus, the motion vector search for the current block can make a motion vector selection that is optimal in a more global sense, not merely in the sense of minimizing a combination of local distortion and local bit rate. The presently-disclosed process of motion vector estimation for the current frame may produce a motion vector field that is encoded with a smaller number of bits (i.e., lower bit rate) and that re-aligns at object boundaries so as to maintain alignment with the true motions of the one or more objects in the current frame.

The statistically-popular motion vectors $c_1, c_2, \ldots, c_n$ for the current frame may be derived from an initial set of motion vectors for the current frame, e.g., by identifying the locations of the n most dominant peaks in a histogram of the motion vectors of the initial set.

The initial set of motion vectors for the current frame may be simply the motion vectors determined from motion estimation on a previous frame. Alternatively, the initial set of motion vectors may be determined by performing a lower-resolution motion estimation on the current frame using a conventional rate-distortion function, i.e., without consideration of expected future benefit. (Lower resolution means larger block size.) As yet another alternative, the initial set of motion vectors may be determined by performing a preliminary motion estimation pass on the current frame using a conventional rate-distortion function with small value of $\lambda$, thus emphasizing distortion minimization more than in the final motion estimation pass, which incorporate expected future benefit.

In one set of embodiments, a method for encoding a sequence of video frames may include performing a motion vector search for a current block of a current frame of the video frames, where said performing the motion vector search includes: (a) computing a rate distortion value $J(v)$ based on a linear combination of a distortion value $D(v)$ and a bit cost value $R(v,p,C)$, where the distortion value $D(v)$ represents a measure of distortion of the current block relative to a corresponding block $B_v$ in a reference frame, where the corresponding block $B_v$ has a position in the reference frame that is defined by a test vector position v and a position of the current block in the current frame, where the bit cost value $R(v,p,C)$ depends on a test vector position v, a prediction vector p for the current block and a set C of one or more vectors $c_1, c_2, \ldots, c_n$, where the one or more vectors $c_1, c_2, \ldots, c_n$ are estimates of statistically popular motion vectors for the current frame; and (b) selecting a test vector position v* from a plurality of test vector positions that gives a minimum rate-distortion value.

BRIEF DESCRIPTION OF THE DRAWINGS

A better understanding of the present invention can be obtained when the following detailed description of the embodiments is considered in conjunction with the following drawings.

FIG. 3 illustrates one embodiment of a method 300 for encoding video data.

FIGS. 4 and 5 illustrate respective method embodiments for encoding video data using more than one reference frame.

Figure 1A:
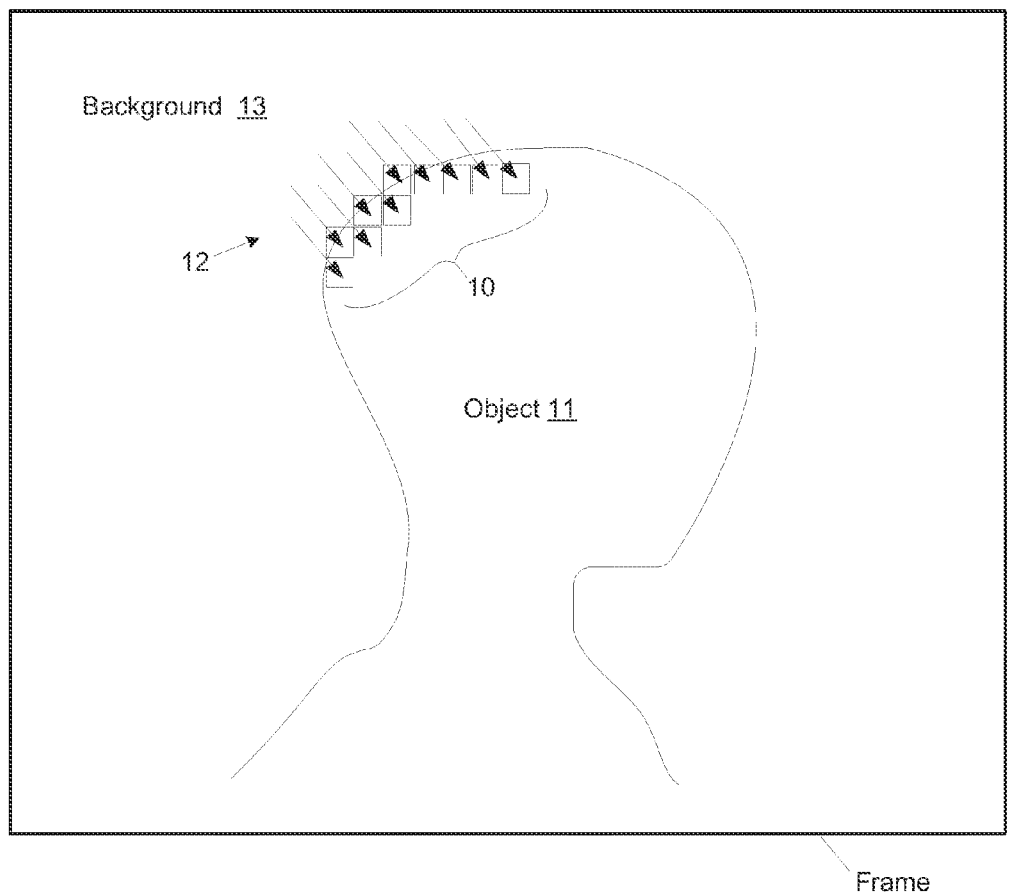
FIG. 1A illustrates the penetration of poorly chosen motion vectors at the upper left edge of an object due to conventional Lagrangian-based optimization with a high value of $\lambda$.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following is a list of acronyms used in this patent document.

ASIC: Application Specific Integrated Circuit
AVC: Advanced Video Coding
DMVD: Decoder-side Motion Vector Deviation
EDS: Encoded Data Stream
HEVC: High Efficiency Video Coding
VDS: Video Data Stream The following papers give background information on the subject of video coding.

Chang, M. M., Takaln, A. M., & Sezan, M. I. (1997), "Simultaneous motion estimation and segmentation", *IEEE Transactions on Image Processing,* 6 (9), 1326-1333.

Chung, W. C., & Kossentini, F. (1996), "An efficient motion estimation technique based on a rate-distortion criterion", *Acoustics, Speech, and Signal Processing,* ICASSP-96 Conference Proceedings, Volume 4.

Girod, B. (1994), "Rate-constrained motion estimation", *Visual Communications and Image Processing,* 2308.

Glantz, A., Krutz, A., & Sikora, T. (2010), "Adaptive Global Motion Temporal Prediction for Video Coding", *Picture Coding Symposium (PCS),* (pp. 202-205).

Hsieh, C., Lu, P., Shyn, J., & Lu, E. (1990), "Motion estimation algorithm using interblock correlation", *Electronics Letters.*

Kamp, S., Evertz, M., & Wien, M. (2008), "Decoder side motion vector derivation for inter frame coding", *IEEE International Conference on Image Processing,* pp. 1120-1123.

Kossentini, F., Lee, Y., & Smith, M. (1997), "Predictive RD optimized motion estimation for very low bit-rate video coding", *IEEE Journal on Selected Areas in Communications,* 15 (9), 1752-1763.

Software, R. F. (2006, November), "*Origin of Quake3's Fast InvSqrt( )*", from Beyond 3D: http://www.beyond3d.com/content/articles/8/.

Stiller, C., & Konrad, J. (1999), "Estimating motion in image sequences", *Signal Processing Magazine.*

Sullivan, G. J & Wiegand, T. (1998), "Rate-distortion optimization for video compression", *Signal Processing Magazine,* 15 (6), 74-90.

Sullivan, G. J., Ohm, J.-R., Han, W.-J., & Wiegand, T. (2012, December), "Overview of the High Efficiency Video Coding (HEVC) Standard", *IEEE Transactions on Circuits and Systems for Video Technology.*

T. Wiegand, B. G. (2001), "Lagrange multiplier selection in hybrid video coder control", *International Conference on Image Processing,* 2001, *Proceedings,* 2001, 3, pp. 542-545.

Tibshirani, R. J. (2008), "Fast Computation of the Median by Successive Binning", Computing Research Repository (*CoRR*), abs/0806.3301.

Wiegand, T., Schwarz, H., Joch, A., Kossentini, F., & Sullivan, G. J. (2003), "Rate-constrained coder control and comparison of video coding standards", *Circuits and Systems for Video Technology,* 13 (7), 688-703.

Wiegand, T., Steinbach, E., & Girod, B. (2005), "Affine multipicture motion-compensated prediction", *Circuits and Systems for Video Technology, IEEE Transactions,* 197-209.

Terminology

The following is a glossary of terms used in the present application.

Memory Medium—A memory medium is a medium configured for the storage and retrieval of information. Examples of memory media include: various kinds of semiconductor memory such as RAM and ROM; various kinds of magnetic media such as magnetic disk, tape, strip, film, etc.; various kinds of optical media such as CD-ROM and DVD-ROM; various media based on the storage of electrical charge and/or other physical quantities; media fabricated using various lithographic techniques; etc. The term "memory medium" may also include a set of two or more memory media which reside at different locations, e.g., at different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer (PC), mainframe computer system, workstation, laptop computer, tablet computer, network appliance, Internet appliance, personal digital assistant (PDA), mobile phone, media player, television system, video conferencing system, speakerphone, grid computing system, or other device or combinations of devices. In general, the term "computer system" can be broadly defined to encompass any device (or combination of devices) having at least one processor that executes instructions stored in a non-transitory memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Low-Complexity Ad-Hoc Global Motion for Low Bitrate Coding

It has been recognized that motion vector transmission can be a significant factor in the overall cost of encoding an image sequence. Girod (1994) establishes a theoretical framework for rate-constrained motion estimation. In this seminal paper, a hybrid-coding scheme is described due to the fact that "low bit-rate coders are severely rate-constrained, and coarser motion compensation is appropriate for lower bit-rates." Kossentini, Lee & Smith (1997) propose using neighboring motion vectors as a way of predicting likely candidate regions in the space of motion vectors: "The design of the prediction parameters is simplified by computing correlation coefficients and mutual information values between motion vectors within a sufficiently large 3-D region of support (ROS) and the current motion vector. Such a region includes previously coded motion vectors representing blocks that are close spatially and/or temporally." In Sullivan & Wiegand, "Rate-distortion optimization for video compression" (1998), Lagrangian optimization techniques are used to clarify what part of the video signal should be coded using what method. The AVC/H.264 video coding standard introduced the concept of the non-zero skip vector, which is based on the median of three neighboring motion vectors. This skip vector allows a block to be updated (i.e., motion compensated) even though no other information is transmitted describing changes to the block. Utilization of this technique makes it possible at low bit-rates to skip code large moving areas by simply allowing the prediction vector to govern the motion of blocks.

During development of the emerging HEVC standard, research was conducted in global motion models for coding motion vectors. In "Affine multipicture motion-compensated prediction" (2005), Wiegand, Steinbach & Girod describe affine multipicture motion-compensated prediction, which finds correlations across multiple reference frames. Also Glantz, Krutz & Sikora (2010) proposed adaptive global motion temporal prediction for video coding which relies on sending global motion vector side-information to allow compensation of the entire motion vector field in a unified manner.

The HEVC standard adopted a variation of techniques proposed by Kamp, Evertz & Wien (2008) on decoder-side motion vector derivation (DMVD) for inter-frame coding. One can describe this approach as an ad-hoc global motion method, as opposed to global motion modeling. The ad-hoc method works surprisingly well even for camera panning, considering its lack of global motion awareness. The reason the ad-hoc approach works is because motion tends to be highly correlated. (See Hsieh, Lu, Shyn & Lu, 1990). Since correlation occurs both spatially and temporally, by having an encoder choose the method of correlation, very little additional side information is needed to construct a global motion model.

The method being adopted in HEVC comprises two encoding methods: (1) merge mode and (2) motion vector prediction for non-merge mode. (See Sullivan, Ohm, Han & Wiegand, 2012.) Merge mode uses a motion vector "competition" scheme to choose the best neighboring motion vector to represent the motion of the present region. The chosen vector is described via an index. In non-merge mode, two spatial candidates are chosen, and the motion vector is differentially coded using a motion vector predictor. Both of these techniques can be considered part of ad hoc global motion since specific global motion vector data is not included in the transmitted information. Therefore, in some embodiments, we aim to improve global motion tracking when existing ad hoc encoding techniques are used.

Lagrangian Optimization of Vector Fields

It can be argued that the reason global motion models fail to get adopted in standards is that ad-hoc models are able to provide equivalent rate-distortion benefits without the negative aspects of describing motion using global parameters, nor is there the extra burden placed on the encoder to compute global motion parameters. But ad-hoc methods would never have been considered if they were not competitive with techniques utilizing global motion models. The reason ad-hoc models work so well is because it is possible to align the motion-vector field using Lagrangian optimization techniques such that the motion can be described using "edge vectors" and the interior of objects are motion-compensated via decoder-side predictive techniques such as Decoder-side Motion Vector Deviation (DMVD).

The key to the Lagrangian optimization is the selection of $\lambda$, the Lagrange multiplier value, as disclosed by T. Wiegand (2001). As $\lambda$ is increased, the motion vector field is forced to adhere to stricter alignment at the expense of greater residual distortion. As $\lambda$ is decreased, the motion vector field is relaxed, to better represent the lowest distortion at the expense of sending more motion vector information. In theory, using a high value of $\lambda$ works fairly well, but in practice, the motion vector correlation is constrained by the position of the prediction vector components. In other words, in AVC, motion prediction is more accurate downward and to the right, since the prediction vectors are spatially above and to the left of the current vector. In HEVC, motion prediction propagates downward and to the right, but is mitigated somewhat by a temporal seed vector that is below and to the right, and therefore will provide a predictive component upward and to the left by one vector component. In either algorithm, the motion-vector field can break down on the upper-left edges of low-texture objects. If there is too little texture to create significant distortion at high $\lambda$ values, then the motion-vector field will be ruled by the rate component and not be perturbed, causing object boundaries to be blurred.

As shown in FIG. 1A, Lagrangian-based motion estimation at high values of $\lambda$, leads to globally poor choices of motion vector at blocks 10 interior to the object 11 (person's head) and at the upper-left edge of the object. Motion vectors 12 from the background 13 (which is assumed to be moving towards the bottom right) penetrate into the edge blocks 10. In other words, the motion vectors selected for the edge blocks 10 are consistent with background motion vectors 12, and thus, do not accurately represent the true motion of the object. (The object is assumed to be at a constant position within the image in the illustrated example.)

The reason for the breakdown in the motion-vector field is that the motion vector search uses localized (or greedy) Lagrangian optimization, and thus, the optimal global motion solution is not realized. In other words, the selection of the motion vector v for a current block of the frame considers only (a) the distortion of the current block and (b) the immediate bit rate cost of encoding the motion vector v, and ignores the effect that selection might have on the selection of motion vectors in future blocks of the frame. It would be advantageous to incorporate some accounting for that future effect into the process of motion vector selection.

Accounting for the Benefit of a Motion Vector Choice on Future Blocks

In one set of embodiments, the motion vector search for a current block may be performed with an improved cost function that accounts not only for the direct cost (i.e., local cost) of a motion vector selection but also for a future benefit of that selection on blocks not yet processed in the current frame. A global motion vector cost may be defined as the direct cost (or local cost) of the motion vector selection minus the expected future benefit of that selection:

Global_MV—Cost=Direct_Cost−Expected_Future_Benefit.

The expected future benefit of a motion vector selection v may be correlated with an average of distances {d(k)} corresponding to future blocks {B(k)} in the frame, where distance d(k) is the distance between the motion vector v and a pre-determined motion vector w(k) for a corresponding future block B(k) in the frame.

Figure 1B:
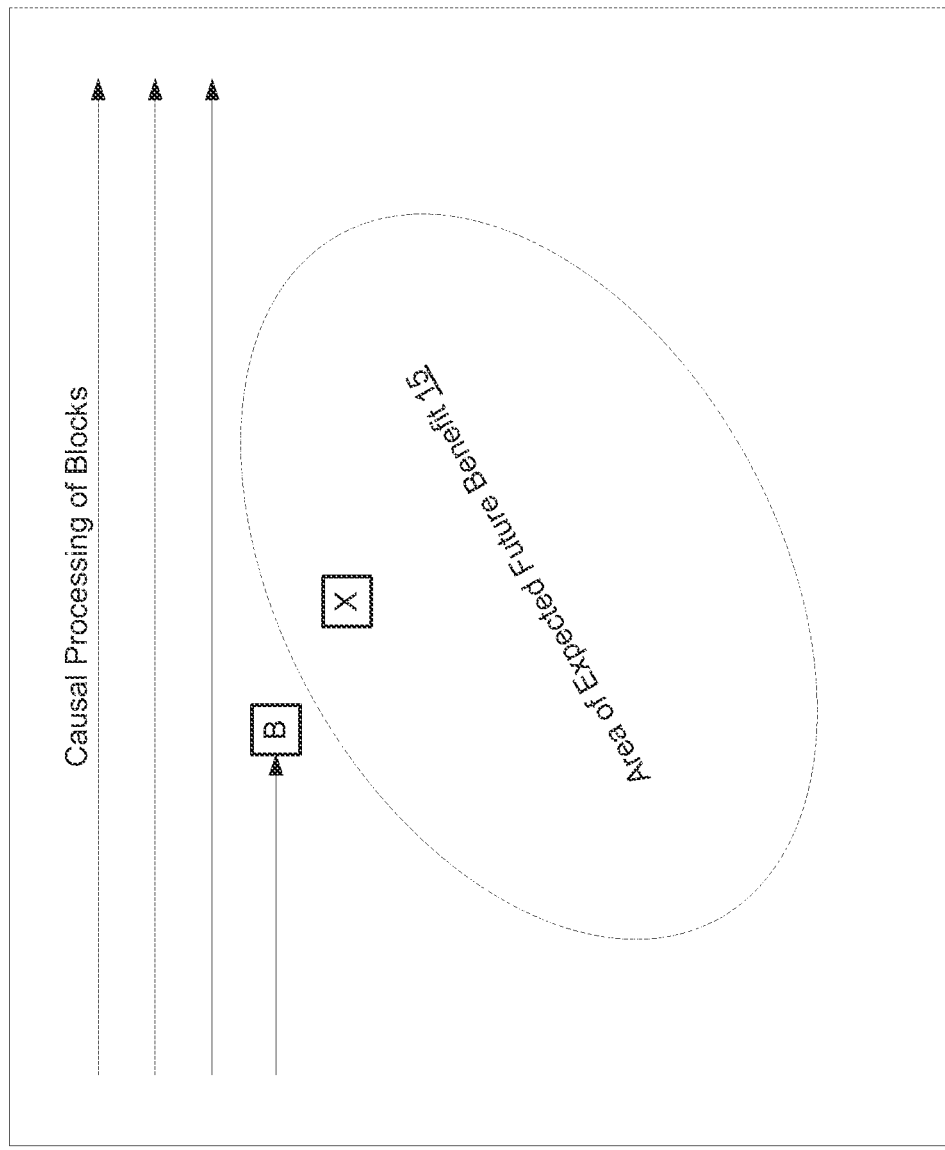
FIG. 1B illustrates the concept of expected future benefit of a motion vector choice at a current block B.

FIG. 1B illustrates the concept of future benefit of a motion vector selection. Given a current block B according to a causal processing order of the blocks in the frame, there is an area 15 of blocks in the future region (i.e., non-causal region that has not yet been processed) of the frame that would benefit from an appropriate selection of motion vector at block B. For example, if the motion vector selected at block B is close to the actual motion vector of the block X, the motion vector search for block X will be able to achieve a significantly lower cost for its best Lagrangian-optimized motion vector.

Simplified Global Motion Modeling

The incorporation of the expected future benefit into the rate distortion function causes the motion vector search for the current block to be biased towards selecting a vector that is the same as (or similar to) future motion vectors in the frame. In some embodiments, the following two-stage approach may be used: 1) generate an initial set of motion vectors that represent estimates (or predictions) of the motion vectors for the respective blocks of the current frame; and 2) for each block in the current frame, minimize a future-aware (global) cost function to select a final motion vector for that block, where the future-aware cost includes local costs and also an estimate of the benefit that a candidate motion vector v will provide on the selection of future motion vectors of the current frame. The future-aware cost may be based on (or utilize information derived from) the initial set of motion vectors.

In some embodiments, simulated annealing may be used to establish the final motion vectors for the current frame. In other words, one or more passes of motion vector searching may be performed to establish the initial set of motion vectors for the current frame, each pass using a successively larger value of $\lambda$, and then a final pass with a largest value of $\lambda$ may be used to establish the final motion vectors. In each pass, the expected future benefit may be computed using the motion vectors determined from the previous pass.

Since many global motion modeling algorithms require significant complexity, as per the approaches discussed by Chang, Takaln, & Sezan (1997) and by Stiller & Konrad (1999), it is advantageous to provide a solution that does not impose a substantial computational burden on the encoding. Some of the advantages of the technique proposed by Chang et al. could be realized by simplifying the motion model to translational motion only, as opposed to affine modeling approaches that attempt to model translations and rotations. In addition, complexity may be greatly reduced by avoiding the task of simulated annealing, where even two annealing passes would be prohibitive in most real-time environments.

One approach that may require the least amount of additional complexity involves using the motion vectors determined from the processing of the previous frame as predictors for the motion vectors in the current frame, i.e., as the initial set of motion vectors for the current frame. This approach is less complex than the hierarchical approach (that involves performing a preliminary low-resolution search), and in fact does not require any additional pass of motion searching to be performed per frame, although there is a temporal delay of one frame time, which can skew results during fast scene transitions.

Even after the simplification of the motion model to objects consisting of translational motion, the process of finding the objects in the current frame can still be complex. Often areas of identical motion (e.g., identical vector velocity) are not spatially correlated or connected within an image, such as when looking through a grove of trees at a background. Thus, in some embodiments, we chose simply to identify the most popular motion vectors in the frame, i.e., vectors that represent the largest spatial concentrations of population in a histogram of the initial motion vectors (i.e., the motion vector predictions) for the current frame. We can assume that the number K of objects in an image is limited (e.g., $K \leq 5$).

In some embodiments, for computational simplicity, the expected future benefit may be computed without performing simulated annealing, e.g., as described above by using the motion vectors from the previous frame to define the initial set of motion vectors for the current frame. Setting the current motion vector to the most popular motion vector in the initial set has the greatest likelihood of allowing a future motion vector to use the current motion vector as a low-cost prediction. Therefore, the vector with the highest expected future benefit is the most popular motion vector from the initial set.

Once the most popular motion vectors have been identified, the global cost may be minimized for each block of the current frame. The global cost may include a local rate-distortion (RD) cost and an expected noncausal benefit (expected future benefit). The expected noncausal benefit may involve evaluating a deviation associated with each of the most popular motion vectors in the initial set of motion vectors. For example, in one embodiment, the global cost may have the form:

Global_Cost=Distortion+$\lambda$(Bit_Cost−Expected_Noncausal_Benefit).

Since the skip vector has zero cost associated with it, and is judged based purely on its absolute distortion, to simplify the computation of the global cost, the most popular motion vectors may also be measured with no additional cost penalty, making them equivalent due to potential benefit from future cost savings. The motion vector selected on the basis of minimizing the global cost may have the highest probability of maximizing expected noncausal benefit while still maintaining close to minimum local direct cost.

Incorporating the ability to correlate the selected motion vector to one of most popular motion vectors adds a segmentation decision for object boundaries. The algorithm can then model "fast freeze" simulated annealing of the motion vector field without the risk of binding to false motion vectors. This approach may allow higher $\lambda$ values to be used to more tightly correlate motion vectors, without losing the ability to abruptly change the vector flow on upper-left (noncausal prediction) object boundaries, thereby reducing global motion vector cost.

Figure 2A:
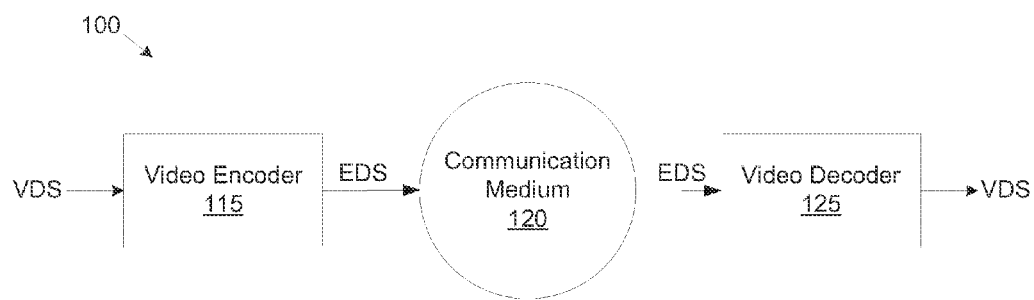
FIG. 2A illustrates one embodiment of a video communication system 100.

FIG. 2A: Video Communication System

In one set of embodiments, a video communication system 100 may be configured as shown in FIG. 2A. The video communication system 100 includes a video encoder 115, a communication medium 120 and a video decoder 125. The video encoder 115 may receive a video data stream VDS from a video data source, and encode the video data stream VDS to obtain an encoded data stream EDS. (The video data stream may comprise a sequence of images, which are also referred to herein as video frames.) The video encoder may employ any of the methods described herein to perform the encoding of the video data stream. The video encoder transmits the encoded data stream EDS onto the communication medium 120, which transmits the encoded data stream to the video decoder 125. In some embodiments, the communication medium 120 may include a wired transmission medium such as an electrical cable, or an optical transmission medium such as optical fiber or the atmosphere, or a wireless transmission medium such as the atmosphere, or any combination of the foregoing. In some embodiments, the communication medium 120 may be (or include) a computer network such as a wide area network or a local area network. (For example, the computer network may be the Internet or a network maintained by a provider of video programming or a cable television network.) The video decoder 125 decodes the encoded data stream EDS to recover the video data stream VDS or an approximation to the video data stream. The video decoder may employ conventional means to perform the decoding. The recovered video data stream may be supplied to a display device for display to one or more users.

The video encoder 115 may be realized by a computer executing stored program instructions, by dedicated digital circuitry such as one or more ASICs, by programmable hardware such as one or more FPGAs, or by any combination of the foregoing elements.

In some embodiments, video encoder 115 may be part of a video conferencing system or part of a videoconferencing endpoint.

In some embodiments, the video encoder 115 may used in a mobile device such as a mobile phone, tablet computer, personal digital assistant, media player, etc. For example, a mobile device may capture video (from its built-in camera) that has a significant amount of global motion. The video encoder 115 may encode the captured video stream with increased compression efficiency, without the computational burden of prior art methods.

In some embodiments, a mobile device may capture video and encode the video, e.g., using a conventional encoding algorithm, in order to obtain an initial encoded bitstream. The initial encoded bitstream may be uploaded to a server. The server may transcode the initial encoded bitstream to obtain a final encoded bitstream. The transcoding involves decoding the initial encoded bitstream to obtain an intermediate video stream, and re-encoding the intermediate video stream to obtain the final encoded bitstream. The video encoder 115 (or method corresponding thereto) may be used to perform the re-encoding. The video encoder 115 may realize improved compression efficiency (as compared to prior art methods).

Figure 2B:
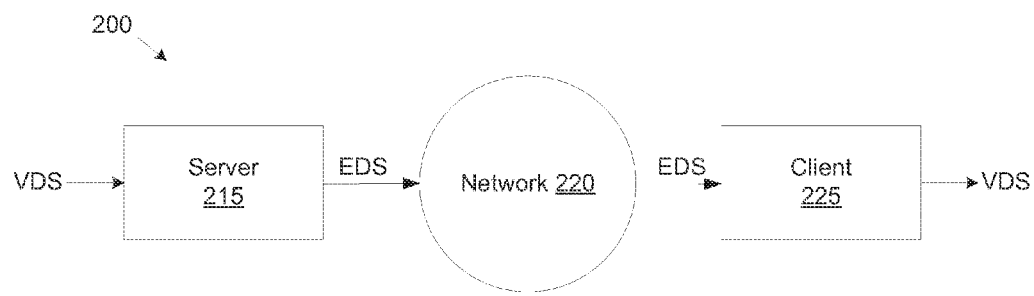
FIG. 2B illustrates one embodiment of a client-server based system for supplying video data.

FIG. 2B—Video Delivery System Using Client-Server Architecture

FIG. 2B illustrates one set of embodiments of a video delivery system 200 that uses a client-server architecture. The video delivery system includes a server 215 and a client 225 that are connected via a network 220. The client 225 may send a request for video data to the server 215 through the network 220, e.g., by conventional means. The request may identify a particular video program or a particular piece of video content from a stored library of content or a particular television channel from a set of channels offered by a service provider. In response to receiving the request, the server 215 may access a video data stream VDS from a video source, and encode the video data stream to obtain an encoded data stream EDS. The server may employ any of the methods described herein to perform the encoding of the video data stream. The server may transmit the encoded data stream EDS onto the network 220, which transmits the encoded data stream to the client 225. Network 220 may be variously realized as described above. The client 225 may decode the encoded data stream to recover the video data stream VDS or an approximation of the video data stream. The client may employ conventional means to perform the decoding. The recovered video data stream may be supplied to a display device for display to one or more users.

FIG. 3—Method for Encoding Video Data

In one set of embodiments, a method 300 for encoding video data may include the operations shown in FIG. 3. (Furthermore, method 300 may include any subset of the features, elements and embodiments described below in connection with methods 400, 500, 600 and 700.) The video data may include a sequence of frames, with each frame comprising an image (e.g., a two-dimensional array of pixels). The method 300 may be performed by a processing agent, e.g., by a set of one or more processors executing stored program instructions, by dedicated digital circuitry such as one or more ASICs, by one or more programmable hardware elements, or by any combination of the foregoing.

At 310, the processing agent may encode a current frame of the frame sequence with respect to a reference frame of the frame sequence. (The reference frame may be a previous frame of the frame sequence or a following frame of the frame sequence.) The action of encoding the current frame may include sequentially processing a plurality of blocks of the current frame according to an ordering of the blocks, e.g., according to a raster ordering. The plurality of blocks may be all of the blocks in the current frame, or a proper subset of the blocks in the current frame. The plurality of blocks preferably form a contiguous region. (In one embodiment, the plurality of blocks form a rectangular region within the current frame.) The action of processing a current block of the current frame may include performing a motion vector search for the current block over a plurality of test vector positions. The action of performing the motion vector search may include operations 315 and 320 as described below.

As indicated at 315, for each test vector position v of the plurality of test vector positions, the processing agent may compute a rate distortion value $J(v)$ based on a linear combination of a distortion value $D(v)$ and a bit cost value $R(v,p,C)$. The distortion value $D(v)$ represents a measure of distortion of the current block $B_v$ relative to a corresponding block in the reference frame. The corresponding block $B_v$ has a position in the reference frame that is defined by the test vector position v and a position of the current block in the current frame. (In some embodiments, the distortion value $D(v)$ may be computed according to a conventional distortion function D, e.g., a distortion function specified by any of various video coding standards such as the AVC/H.264 standard or the H.265 standard.) The bit cost value $R(v,p,C)$ may depend on the test vector position v, a prediction vector p for the current block and a set C of one or more vectors $c_1, c_2, \ldots, c_n$.

The prediction vector p may be obtained using conventional algorithms. For example, according to MPEG2, the prediction vector p may be determined using the motion vector of the spatially previous macroblock (the block to the left). As another example, according to AVC, the prediction vector p may be determined using the median of three motion vectors corresponding to the block to the left, the block above, and the block above right, with modifications depending on availability of the vectors. As yet another example, according to HVEC, an index is used to indicate which of the neighboring blocks is to supply the prediction vector for the current block, where the neighboring blocks may include the co-located block from a previous frame as well as spatially neighboring block in the current frame.

The one or more vectors $c_1, c_2, \ldots, c_n$ may be estimates of the n most statistically-popular motion vectors for the current frame, where n is a positive integer. In some embodiments, the vectors $c_1, c_2, \ldots, c_n$ may be determined by performing a histogram on motion vectors determined for the blocks in a previous (or nearby) frame of the frame sequence.

At 320, the processing agent may select a test vector position v* from the plurality of test vector positions that gives a minimum rate-distortion value J(v*):

$$v^* = \arg\min J(v).$$

In some embodiments, the rate distortion value J(v) is given by the expression J(v)=D(v)+λR(v,p,C), where λ is a positive scalar value.

In some embodiments, the action of encoding the current frame also includes: (a) encoding the difference vector d=v*−p to obtain encoded bits; and (b) transmitting the encoded bits through a channel (e.g., the above-described communication medium 120 or network 220) to a decoder. In one embodiment, the action of encoding the difference vector d=v*−p may include encoding a x-component $d_X$ of the difference vector to obtain a first portion of the encoded bits, and encoding a y-component $d_Y$ of the difference vector to obtain a second portion of the encoded bits.

In some embodiments, the bit cost value R(v,p,C) may be computed as a sum of an x-component bit cost $R_X(v_X,p_X,C_X)$ and a y-component bit cost $R_Y(v_Y,p_Y,C_Y)$, where $v_X$ and $v_Y$ are x and y components of the test vector v, where $p_X$ and $p_Y$ are the x and y components of the prediction vector v, where $C_X$ is the set of x-components of the vectors $c_1, c_2, \ldots, c_n$, where $C_Y$ is the set of y-components of the vectors $c_1, c_2, \ldots, c_n$.

In one embodiment, the bit cost value $R_X(v_X,p_X,C_X)$ may be computed according to the following expressions:

$$E_X = R_0(v_X - p_X),$$

$$F_X = \min\{E_X, \text{MinXCost}\},$$

$$G_X = \log_2(1 + |v_X - c_{1X}|),$$

$$H_X = \min\{1, G_X/N_X\},$$

$$R_X(v_X, p_X, C_X) = E_X - (E_X - F_X)(1 - H_X)^* \text{XScaleFactor},$$

where $R_0(z)$ is a conventional bit-rate cost function, e.g., a bit-rate cost function defined by any of various existing video coding standards, where MinXCost, $N_X$ and XScaleFactor are parameters, where $c_{1X}$ is the x component of the vector $c_1$, where int{z} denotes the integer part of z, where |z| denotes the absolute value of z.

Similarly, the bit cost value $R_Y(v_Y,p_Y,C_Y)$ may be computed according to the following expressions:

$$E_Y = R_0(v_Y - p_Y),$$

$$F_Y = \min\{E_Y, \text{MinYCost}\},$$

$$G_Y = \log_2(1 + |v_Y - c_{1Y}|),$$

$$H_Y = \min\{1, G_Y/N_Y\},$$

$$R_Y(v_Y, p_Y, C_Y) = E_Y - (E_Y - F_Y)(1 - H_Y)^* \text{YScaleFactor},$$

where MinYCost, $N_Y$ and YScaleFactor are parameters, where $c_{1Y}$ is the y component of the vector $c_1$.

In some embodiments, the bit cost value R(v,p,C) may be determined by: (1) computing a baseline bit cost value $R_0(v,p)$ that represents a bit cost for encoding a difference vector d=v−p; (2) computing a bias value ΔR(v,C) based on a bias function ΔR that has a local minimum at each of the vectors $c_1, c_2, \ldots, c_n$; and (3) adding the baseline bit cost value $R_0(v,p)$ and the bias value ΔR(v,C) to obtain the bit cost value R(v,p,C):

$$R(v,p,C) = R_0(v,p) + \Delta R(v,C).$$

The bias function ΔR may approach zero as the difference vector d approaches zero. In one embodiment, the bias function ΔR may be identically zero in a neighborhood of the prediction vector p.

In some embodiments, the plurality of test vector positions are restricted to a union of a neighborhood of the prediction vector p and neighborhoods of the vectors $c_1, c_2, \ldots, c_n$:

$$v \in N(r_p, P) \cup N(r_1, c_1) \cup N(r_2, c_2) \cup \ldots \cup N(r_n, c_n),$$

where N(r,x) denotes a neighborhood of radius r centered at point x. This restriction may serve to accelerate the search for the minimizing test vector position v*.

In some embodiments, the number n equals one. In some of these embodiments, the bit cost value R(v,p,C) reduces to $R(v,p,c_1)$, and may be determined by: (a) computing a baseline bit cost value $R_0(v,p)$ that represents a bit cost for encoding a difference vector d=v−p; and (b) computing a minimum of the baseline bit cost value $R_0(v,p)$ and a predetermined constant value that corresponding to the most popular motion vector $c_1$. The minimum is used as the bit cost value R(v,p,C).

In some n=1 embodiments, the bit cost value R(v,p,C)=R (v,p,$c_1$) may be determined by computing a minimum of a first value and a second value. The first value may be determined by evaluating a standard rate function $R_0$ at the vector v, where the standard rate function $R_0$ has a minimum at the prediction vector p, e.g., as specified in any of various existing video encoding standards. The second value may be determined by evaluating a function $R_1$ at the vector v, where the function $R_1$ has a minimum at the vector $c_1$. The minimum value of the function $R_1$ may be configured to be greater than the minimum value of the standard rate function $R_0$.

In some embodiments, the action of encoding the current frame also includes computing the vectors $c_1, c_2, \ldots, c_n$ by (1) computing a histogram of motion vectors associated with blocks in a nearby frame of the frame sequence, i.e., near to the current frame in the frame sequence; (2) identifying the n largest peaks in the histogram; and (3) for each of the n largest peaks, determining a location of the peak. Each of the n largest peak locations defines a corresponding one of the vectors $c_1, c_2, \ldots, c_n$. (The vectors $c_1, c_2, \ldots, c_n$ may be ordered according to size so that $c_1$ corresponds to the largest peak, $c_2$ to the next largest peak, and so on.) The histogram may be a two-dimension histogram, i.e., a histogram whose bins form a two-dimensional array. The bins may be indexed by the x component of the motion vector and the y component of the motion vector. The histogram may be smoothed (e.g., low-pass filtered) with respect to the bin index variables before the identification of peaks.

In one embodiment, the location of a peak may be the location where the peak attains its maximum value. In another embodiment, the location of a peak may be the location of the center of mass of the peak. In yet another embodiment, the location of a peak may be the location $(m_X, m_Y)$, where $m_X$ is the median value of the peak along the horizontal bin index and $m_Y$ is the median value of the peak along the vertical bin index. In other embodiments, the location of a peak may be some other statistic or parameter derived from the peak.

In some embodiments, the action of encoding the current frame also includes computing the vectors $c_1, c_2, \ldots, c_n$ by computing a histogram of previously-computed motion vectors for the blocks of the current frame. For example, according to a simulated annealing procedure, the processing agent may perform two or more iterations of motion vector estimation on the current frame, with each iteration using a successively larger value of the Lagrange multiplier $\lambda$. In a first iteration, the value of $\lambda$ may be small (while still positive), thus emphasizing the minimization of distortion in the selection of motion vectors for the respective blocks in the current frame. In a second iteration, the value of $\lambda$ may be increased, thus placing increasing emphasis on the minimization of rate (number of encoded bits resulting from the motion vector selection) relative to minimization of distortion. The vectors $c_1, c_2, \ldots, c_n$ used in the second iteration may be determined from a histogram of the motion vectors determined in the first iteration. In a third iteration, the value of $\lambda$ may be further increased, thus placing even more emphasis on minimization of rate. The vectors $c_1, c_2, \ldots, c_n$ used in the third iteration may be determined from a histogram on the motion vectors determined in the second iteration, and so on. Of course, the number n of vectors $c_1, c_2, \ldots, c_n$ need not be the same in different iterations. In general, the number n may be dependent on iteration index k, i.e, n=n(k).

In some embodiments, the processing agent may generate initial motion vectors for the respective blocks in the current frame. (A block may represent any appropriate subdivision of the frame, including but not limited to a macroblock as defined by the AVC/H.264 standard, or a prediction unit (PU) as defined by the H.265 standard.) Those initial motion vectors may be generated prior to performing the encoding operation 310 of method 300. The vectors $c_1, c_2, \ldots, c_n$ used in method 300 may be the n most popular motion vectors among the initial motion vectors, e.g., derived from analyzing a histogram of the initial motion vectors.

The initial motion vectors may be generated using any of various different techniques. In one embodiment, the initial motion vectors may be based on the motion vectors determined for one or more previous frames of the video sequence, e.g., as a result of having previously executed method 300 on the previous frame(s).

In another embodiment, the initial motion vectors may be generated by performing a lower-resolution motion vector search on the current block, i.e., a motion vector search with lower resolution than the motion vector search performed in the encoding operation 310 of method 300. (The blocks of the lower resolution search are larger than the blocks for the motion vector search performed in the encoding operation 310.) This approach may be referred to as the "hierarchical approach". The lower-resolution search may be based on conventional Lagrangian-based optimization, i.e., without the inclusion of the expected future benefit.

In yet another embodiment, the initial motion vectors may be generated using a multipass annealing approach, where multiple passes of motion vector searching are performed, with each pass using a successively larger value of $\lambda$. The motion vectors determined in each pass may be used as the basis for the next pass. Other methods for generating the initial motion vectors may also be used.

FIGS. 4 and 5—Encoding Using More than One Reference Frame

In one set of embodiments, a method 400 for encoding video data may include the operations shown in FIG. 4. The video data may include a sequence of frames, with each frame comprising an image. (The method 400 may also include any subset of the features, elements and embodiments described above in connection with method 300 and described below in connection with methods 500, 600 and 700.) The method 400 may be performed by a processing agent as described above.

At 410, the processing agent may encode a frame of the frame sequence with respect to m reference frames of the frame sequence, where m is greater than one. The action of encoding the frame includes sequentially processing a plurality of blocks of the frame according to an ordering of the blocks. The action of processing a given block of the frame may include performing a motion vector search for the block over a search space of m-tuples $(v_1, v_2, \ldots, v_m)$, where each vector $v_k$, k=1, 2, ..., m, of the m-tuple $(v_1, v_2, \ldots, v_m)$ is a candidate motion vector for the block with respect to a $k^{th}$ one of the reference frames. The motion vector search may include, for each m-tuple of the search space, computing a bit cost value $R(v_k, p, E)$ for each vector $v_k$ in the m-tuple, where the bit cost value $R(v_k, p, E)$ depends on vector $v_k$, a prediction vector p for the block, and a vector set E. The vector set E includes one or more vectors from a set of vectors $\{e_1, e_2, \ldots, e_L\}$, where the vectors $e_1, e_2, \ldots, e_L$ are estimates of the L most statistically-popular motion vectors of the frame, where L is a positive integer.

In the case where a single statistically-popular motion vector is used for each reference frame, the bit cost value $R(v_k, p, E)$ may be determined, e.g., as variously described above in connection with method 300. However, more than one statistically-popular motion vector may also be used.

In one set of embodiments, a method 500 for encoding video data may include the operations shown in FIG. 5. The video data may include a sequence of frames, with each frame comprising an image. (The method 500 may also include any subset of the features, elements and embodiments described above in connection with methods 300 and 400, and described below in connection with methods 600 and 700.) The method 500 may be performed by a processing agent as described above.

At 510, the processing agent may encode a frame of the frame sequence with respect to m reference frames of the frame sequence, where m is greater than one. The action of encoding the frame may include sequentially processing a plurality of blocks of the frame according to an ordering of the blocks. The action of processing a given block of the frame includes performing a motion vector search for the block over a search space of m-tuples $(v_1, v_2, \ldots, v_m)$. Each vector $v_k$, k=1, 2, ..., m, of the m-tuple $(v_1, v_2, \ldots, v_m)$ is a candidate motion vector for the block with respect to a $k^{th}$ one of the reference frames. The motion vector search may include operations 515 and 520 as described below.

At 515, for each m-tuple of the search space, the processing agent may: (a) compute a rate distortion value $J(v_k) = D_k$ $(v_k)+\lambda R(v_k,p,E)$ for each vector $v_k$ in the m-tuple, where $D_k(v_k)$ is a distortion value of the block based on the $k^{th}$ reference frame and the vector $v_k$, where $R(v_k,p,E)$ is a bit cost value that depends on vector $v_k$, a prediction vector p for the block, and a vector set E, where the vector set E includes one or more vectors (perhaps all) from a set of vectors $\{e_1, e_2, \ldots, e_L\}$, where the vectors $e_1, e_2, \ldots, e_L$ are estimates of the L most statistically-popular motion vectors of the frame, where L is greater than or equal to one, and (b) determine the index $k_{min}$ of the vector $v_{kmin}$ in the m-tuple that gives the minimum value M of the distortion values $J(v_k)$. The prediction vector p for the block may be determined as variously described above.

At 520, the processing agent may determine an m-tuple T* of the search space that gives a minimum value M* of M. The vector $v_{kmin}$ corresponding to the m-tuple T* is selected as a motion vector for the block.

In some embodiments, the action of processing the block includes: encoding a difference between the selected motion vector for the block and the prediction vector p for the block to obtain output bits; and transmitting the output bits to a video decoder via a communication medium.

Additional embodiments are disclosed in the following numbered paragraphs.

1. A method for encoding a current frame within a frame sequence, the method comprising:

sequentially processing a plurality of blocks of the current frame according to an ordering of the blocks, wherein processing a current block includes:

performing a motion vector search for the current block over a plurality of test vector positions, wherein the motion vector search is relative to one or more previous frames of the frame sequence, wherein said searching includes: (a) computing one or more rate distortion values for each of the test vector positions, wherein a first of the one or more rate distortion values for each of the test vector positions is computed according to a first rate-distortion function, wherein the first rate-distortion function includes a first bias that increases the likelihood of providing a lower rate-distortion value for one or more future blocks, wherein said one or more future blocks are blocks that have not yet been processed in said sequential processing of the blocks; and (b) selecting one of the test vector positions that has a minimum rate-distortion value to be a motion vector for the current block.

1B. The method of paragraph 1, wherein the first rate-distortion function has the form $J(v)=D(v)+\lambda(R_0(v)+\delta R(v))$, wherein v represents the test vector position, wherein $D(v)$ is a distortion of the current block relative to one or more displaced blocks in the one or more previous frames, wherein $R_0(v)$ is a conventional rate distortion function, wherein $\delta R(v)$ is the first bias, wherein $\lambda$ is a positive scalar factor.

2. The method of paragraph 1, wherein the first bias is a first monotonic function of distance of test vector position with respect to a first of the test vector positions, wherein the first monotonic function has a minimum at the first test vector position.

3. The method of paragraph 2, wherein the first test vector position is an estimate of the most popular motion vector among motion vectors of the current frame.

4. The method of paragraph 2, wherein the first test vector position is determined from a histogram of motion vectors selected for blocks of a previous frame of the frame sequence.

5. The method of paragraph 2, wherein a second of the one or more rate-distortion values for each test vector position is computed according to a second rate-distortion function, wherein the second rate-distortion function includes a second bias that is a second monotonic function of distance of test vector position with respect to a second of the test vector positions, wherein the second monotonic function has a minimum at the second test vector position.

6. The method of paragraph 5, wherein the first bias and the second bias have different magnitudes at their respective minima.

7. The method of paragraph 1, wherein the first bias is configured to weight the motion vector search towards selecting a first of the tests vector positions.

8. The method of paragraph 1, wherein said ordering of the blocks of the current frame corresponds to a raster scan of the blocks.

9. The method of paragraph 1, wherein said processing the current block also includes: encoding the selected motion vector for the current block to obtain encoded bits; and transmitting the encoded bits to a video decoder via a communication medium 10. The method of paragraph 1, further comprising:

operating a plurality of processors in parallel, wherein each of said processors is configured to perform said sequentially processing on a corresponding plurality of blocks in the current frame.

11. A method for encoding video data including a frame sequence, the method comprising:

encoding a current frame of the frame sequence with respect to one or more reference frames of the frame sequence, wherein said encoding the current frame includes sequentially processing a plurality of blocks of the current frame according to an ordering of the blocks, wherein processing a current block of the current frame includes performing a motion vector search for the current block over a plurality of test vector positions, wherein said performing the motion vector search includes: (a) for each test vector v in the plurality of test vector positions, computing one or more rate distortion values, wherein a first of the one or more rate distortion values for each test vector position v is computed according to a first rate-distortion function, wherein the first rate-distortion function includes a bias that increases the likelihood of providing a lower rate-distortion value for one or more future blocks, wherein said one or more future blocks are blocks that have not yet been processed in said sequential processing of the blocks; and (b) selecting one of the test vector positions that has a minimum rate-distortion value.

12. The method of paragraph 11, further comprising any subset of the features disclosed in paragraphs 1-10.

Generating the Initial Motion Vectors

As described above, the most popular motion vectors $c_1, c_2, \ldots, c_n$ (or the most popular motion vectors $e_1, e_2, \ldots, e_L$) used in the above-described methods may be derived from an initial set of motion vectors for the current frame. In a single-pass approach for generating the initial motion vectors, the blocks of the current frame may be processed in a raster fashion. Generally, a motion vector search for a current block uses the motion vectors that have already been determined for blocks to the left and above the current block. Motion vectors below and to the right have not yet been computed, and therefore the motion search at the current block cannot use that future information. This is called causality: vectors below and to the right are considered non-causal and cannot be used in creating the lowest global joint optimal rate-distortion vector. Note that a two-pass approach to generating the initial motion vectors for a frame generally produces better results than a single-pass approach. Each pass may involve processing the blocks of the frame in a raster fashion.

In many situations, if there were some way to estimate the non-causal information, those estimates would have a large impact on the choice of optimal motion vector for the current block. Thus, as a preliminary operation, any of the various methods described herein may generate initial motion vectors that estimate the motion vectors of the respective blocks of the current frame. A wide variety of techniques may be used to generate the initial motion vectors.

For example, in one embodiment, the initial motion vectors may be generated based on the motion vectors of a previous frame (or frames). Motion video has high temporal redundancy, i.e., the previous frame tends to share many similar characteristics with the current frame. This temporal redundancy can be exploited to allow some non-causal estimates of the motion below and to the right of the current vector in the current frame. There is a high probability that the motion vector below and to the right in the previous frame will be similar to the motion vector below and to the right in the current frame, and therefore, the former may be used as an estimate for the latter.

In another embodiment, the initial motion vectors may be generated from a hierarchical (lower resolution) search. Motion video also has high spatial redundancy, i.e., motion vectors in the local spatial neighborhood tend to be similar to the current block's motion vector. This spatial redundancy can be exploited by performing reduced-resolution motion estimation on the whole image, which takes considerably less compute power than a full resolution search. For example, if the pixel dimensions of the generic block are reduced by ½ in the horizontal and vertical directions, the complexity of the sum of absolute differences (SAD) calculation is reduced by ¼. Further, the motion vector search range is also reduced by ½ in both the horizontal and vertical directions, so the number of SAD tests is also reduced by ¼. This leads to a total reduction in complexity to 1/16 of the original complexity by simply reducing the dimensions by half. Reducing the dimensions of the image by half again reduces the complexity to 1/256 of a full-resolution motion estimation.

In yet another embodiment, the initial motion vectors may be generated from a multi-pass approach. A plurality of passes of motion estimation are performed on the current frame. Each pass may include executing the process of estimating motion for every block in the current frame. Each pass of motion estimation may use a conventional rate distortion function. The motion vectors generated in the last of the plurality of passes are used as the initial motion vectors. In some embodiments, each pass except for the first pass may use the presently-disclosed rate distortion function that accounts for expected future benefit (as variously described above). In those embodiments, the motion vectors determined from each pass may be used as the basis for the next pass (e.g., used to generate the popular motion vectors $c_1, c_2, \ldots, c_n$ for the next pass as variously described above). Each pass may use a larger value of $\lambda$. This multi-pass approach may produce initial motion vectors of higher quality, but it requires increased computational complexity than the previous frame approach or the hierarchical approach.

Determining Estimates of the Most Popular Vectors in Current Frame

Once the initial motion vectors have been generated, any of various techniques may be used to determine the most popular motion vectors from the initial set of motion vectors, e.g., techniques including but not limited to the following: Global Mean Motion Vector (GMV); Global Median Motion Vector (GMED); Most Likely Motion Vector (MLMV); and Adjusted MLMV.

The GMV technique may work well when there is uniform camera movement such as pan or tilt. The GMV technique may be especially useful where the image can be viewed as containing one large object (i.e., K=1) that fills the whole or the vast majority of the image.

The GMED technique improves on GMV by always producing a real motion vector (i.e., one of the motion vectors of the initial set). The GMED technique, for example, provides a solution in the case where the image contains two objects (K=2). With only two objects in the image, the generic situation is for more than half of the image to have one motion vector and the remainder to have a different motion vector. The GMED will then be the vector associated with the larger object.

The MLMV technique improves upon GMED by allowing K≥2 image objects to be accurately handled. The K most popular motion vectors identified by the MLMV technique correspond to the velocities of the K objects.

And finally, the Adjusted MLMV technique also handles K≥2 objects, but throws out uninteresting motion vector candidates such as the (0,0) motion vector since it is easy to test that point without a special global motion analysis.

Figure 6:
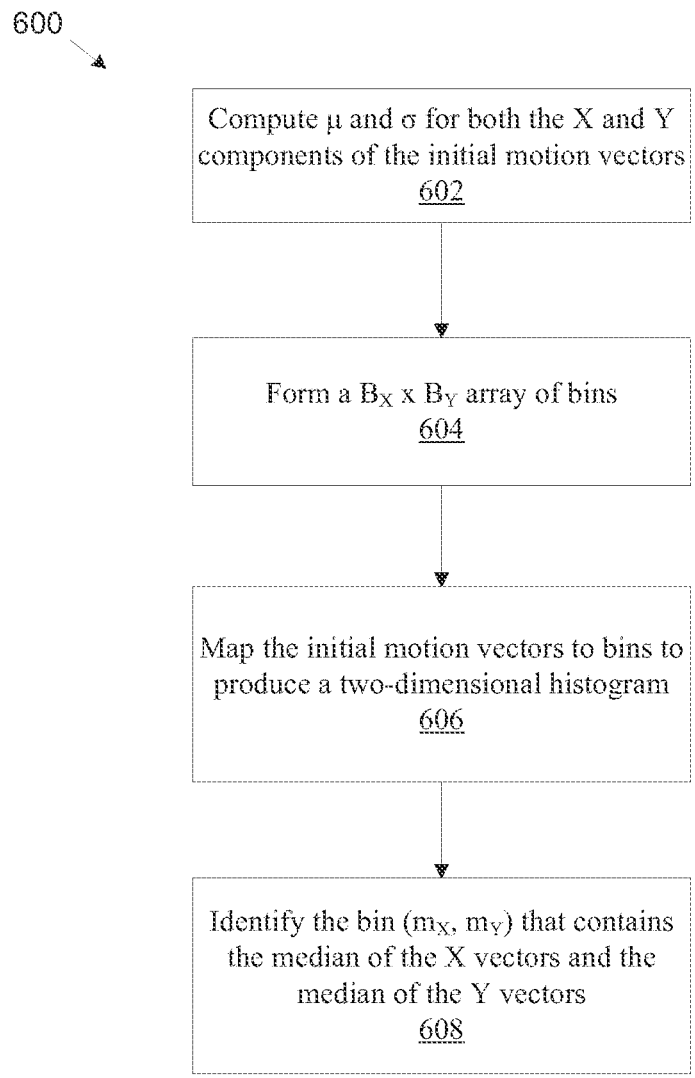
FIG. 6 illustrates one embodiment of a method 600 for computing a global median motion vector.

FIG. 6—The Algorithm for GMED

FIG. 6 illustrates one embodiment of a method 600 for determining a popular motion vector (or a representative motion vector) from the initial set of motion vectors for the current frame. The method 600 may use the GMED technique.

At 602, the method computes the mean ($\mu$) and standard deviation ($\sigma$) for both the X and Y components of the initial motion vectors. In other words, the method computes $\mu_X$, $\mu_Y$, $\sigma_X$ and $\sigma_Y$. Each standard deviation may be calculated or estimated according to any known method. For example, in one embodiment, each standard deviation may be calculated via a 2-pass algorithm, as proposed by Tibshirani (2008). In another embodiment, each standard deviation is computed using a single pass algorithm. For example, the x-component standard deviation $\sigma_X$ may be computed by first computing the x-component variance according to the following expression:

$$\frac{\sum_{i=1}^{N} x_i^2}{N} - \frac{\left(\sum_{i=1}^{N} x_i\right)^2}{N^2},$$

where N is the number of the initial motion vectors, where $x_i$ is the x component of the $i^{th}$ one of the initial motion vectors. The standard deviation $\sigma_X$ may then be determined by taking the square-root of the x-component variance. The square-root can be performed using a fast approximation technique such as Q_rsqrt( ) (Software, 2006). The y component standard deviation $\sigma_Y$ may be similarly computed.

At 604, the method forms a two-dimensional array of bins, e.g., a $B_X \times B_Y$ array of bins. In one embodiment, the two-dimensional array of bins represents (i.e., covers) the following rectangular region in the motion vector space:

$$[\mu_X - K_X \sigma_X, \mu_X + K_X \sigma_X] \times [\mu_Y - K_Y \sigma_Y, \mu_Y + K_Y \sigma_Y],$$

where the notation [a,b] denotes the closed interval from a to b, where $K_X$ and $K_Y$ are positive scale factors. Scale factors $K_X$ and $K_Y$ are typically greater than or equal to one.

(However, in some embodiments, one or both of the scale factors may be less than one.) The rectangular region may be partitioned into $B_X B_Y$ smaller rectangles, with each bin of the $B_X \times B_Y$ array being assigned a corresponding one of the smaller rectangles. The number of bins $B_X B_Y$ will affect the accuracy of the determination of the median vector. Fewer bins make the median calculation faster, but less accurate. More bins improve accuracy at the expense of an increase in complexity. The bins in the horizontal direction are indexed by index variable $b_X$. Thus, each value of $b_X$ identifies a corresponding subinterval along the horizontal axis. The bins in the vertical direction are indexed by the index variable $b_Y$. Thus, each value of $b_Y$ identifies a corresponding subinterval along the vertical axis.

At 606, the method maps the initial motion vectors to bins to produce a two-dimensional histogram. In one embodiment, initial motion vectors falling outside the range of all the bins (i.e., outside the above-identified rectangular region) are not mapped to any bin.

At 608, the method identifies the bin index vector ($m_X$, $m_Y$) such that $m_X$ identifies the horizontal subinterval containing the median of the histogram with respect to the x coordinate, and $m_Y$ identifies the vertical subinterval containing the median of the histogram with respect to the y coordinate. In other words, $m_X$ identifies the subinterval containing the median of the x marginal distribution $f_X(x)$ of the histogram $f_{X,Y}(x,y)$, and $m_Y$ identifies the subinterval containing the median of the y marginal distribution $f_Y(y)$ of the histogram $f_{X,Y}(x,y)$. The media motion vector is defined by the bin index vector ($m_X, m_Y$). For example, the media motion vector may be set equal to the geometric center of the small rectangle covered by the bin ($m_X, m_Y$).

Figure 7:
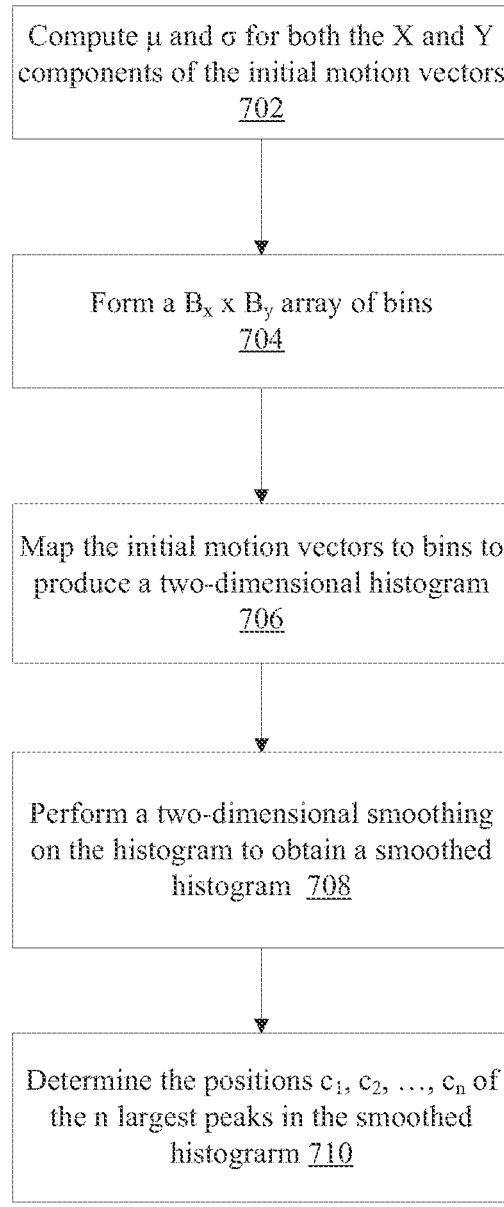
FIG. 7 illustrates one embodiment of a method 700 for determining the most popular motion vectors in a given set of motion vectors.

FIG. 7—The Algorithm for MLMV

FIG. 7 illustrates one embodiment of a method 700 for determining statistically-popular motion vectors (or representative motion vectors) from the initial motion vectors for the current frame. The method 700 uses the most likely motion vector (MLMV) technique.

At 702, the method computes the mean ($\mu$) and standard deviation ($\sigma$) for both the X and Y components of the initial motion vectors, e.g., as discussed above in relation to FIG. 6.

At 704, the method forms a two-dimensional array of bins, e.g., a $B_X \times B_Y$ array of bins, in a manner similar to that discussed above in relation to FIG. 6. In some embodiments, the two-dimensional array of bins covers the following rectangular region in the motion vector space:

$$[\mu_X - K_X \sigma_X, \mu_X + K_X \sigma_X] \times [\mu_Y - K_Y \sigma_Y, \mu_Y + K_Y \sigma_Y],$$

where $K_X$ and $K_Y$ are positive scale factors. Scale factors $K_X$ and $K_Y$ are typically greater than or equal to one. (For example, in one embodiment, $K_X = K_Y = 1.50$.) There is a tradeoff on the optimal number of bins to use. A larger number of bins will require a larger amount of computation time to arrive at the final MLMV results. A smaller number of bins implies that the resolution of the final MLMV results will be low because each bin corresponds to a larger area in the motion vector space.

At 706, the method maps the initial motion vectors to the bins to produce a two-dimensional histogram. Each initial motion vector is mapped to the bin that spatially contains the initial motion vector. Initial motion vectors that fall outside the above-identified rectangular region may be discarded. (The Adjusted MLMV technique is a slight modification of the MLMV technique. The Adjusted MLMV technique involves testing each initial motion vector to determine whether the initial motion vector is equal to any of the one or more vectors in an uninteresting vector set. For example, in one embodiment, the uninteresting vector set may include the zero vector (0,0). If an initial motion vector is equal to one of the vectors in the uninteresting vector set, it may be discarded, i.e., not allowed to contribute to the histogram.)

At 708, the method may perform a two-dimensional smoothing operation (e.g., a low-pass filtering) on the histogram to obtain a smoothed histogram. The filtering operation serves to smooth out small scale discontinuities in the bin population values of the histogram. In one embodiment, the two-dimensional kernel (impulse response) used to perform the filtering has the following form:

$$\frac{1}{9}\begin{bmatrix}1 & 1 & 1\\ 1 & 1 & 1\\ 1 & 1 & 1\end{bmatrix}.$$

However, a wide variety of other forms are possible and contemplated. For example, in other embodiments, the kernel may conform to a Gaussian function or a 2D sinc function or a pyramidal function, etc.

At 710, the method may determine the positions of the n largest peaks in the smoothed histogram. Those positions define the vectors $c_1, c_2, \ldots, c_n$ described above in connection with method 300. Any of a wide variety of peak identification algorithms may be used to identify the n largest peaks. Interpolation may be used to estimate the x and y coordinates of the location of each peak with a resolution greater than the resolution of the respective coordinates $b_X$ and $b_Y$ of the bin index vector ($b_X, b_Y$).

In some embodiments, the method may impose a minimum separation constraint on the n largest peaks. If two local maxima in the smoothed histogram are closer together in motion vector space than a predetermined minimum value, the two maxima may be counted as being part of one unified peak. This constraint prevents the peak identification algorithm from falsely identifying closely-spaced noise-generated local maxima as distinct peaks. In some embodiments, the minimum separation constraint may be expressed in terms of a minimum X separation and a minimum Y separation. (The minimum X separation may be specified in terms of a predetermined percentage of the standard deviation $\sigma_X$. Likewise, the minimum Y separation may be specified in terms of a predetermined percentage of the standard deviation $\sigma_Y$.) Thus, the method may count two local maxima as being part of the same peak if their X separation is less than the minimum X separation value, or, their Y separation is less than the minimum Y separation value.

In some embodiments, the above-described video encoding methods may be used to perform simulated annealing on a frame, i.e., to adjust the motion vector field of a frame toward the true motion vector field of one or more objects in the frame. At any given block, the motion-estimation algorithm may be able to make a motion vector choice that achieves an appropriate balance between minimization of local cost (local distortion and local bit rate) and maximization of expected future benefit. On the edge of an object, the motion estimation algorithm can immediately recognize the cost savings of switching the motion vector to the appropriate one of the most-popular motion vectors $c_1, c_2, \ldots, c_n$ without incurring a significant cost penalty for doing so. (The vectors $c_1, c_2, \ldots, c_n$ correspond to the motion of the largest objects in the frame.) The final motion vector field may provide better rate-distortion characteristics than a motion vector field that was generated based on the minimization of a conventional rate-distortion function.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for encoding video data including a frame sequence, the method comprising:
    encoding a current frame of the frame sequence with respect to a reference frame of the frame sequence, wherein said encoding the current frame includes sequentially processing a plurality of blocks of the current frame according to an ordering of the blocks, wherein processing a current block includes performing a motion vector search for the current block over a plurality of test vector positions, wherein said performing the motion vector search includes:
        for each test vector position v of the plurality of test vector positions, computing a rate distortion value J(v) based on a linear combination of a distortion value D(v) and a bit cost value R(v,p,C), wherein the distortion value D(v) represents a measure of distortion of the current block relative to a corresponding block $B_v$ in the reference frame, wherein the corresponding block $B_v$ has a position in the reference frame that is defined by the test vector position v and a position of the current block in the current frame, wherein the bit cost value R(v,p,C) depends on the test vector position v, a prediction vector p for the current block and a set C of one or more vectors $c_1$, $c_2$, ..., $c_n$, wherein the vectors $c_1$, $c_2$, ..., $c_n$ are estimates of statistically popular motion vectors for the current frame;
        selecting a test vector position v* from said plurality of test vector positions that gives a minimum rate-distortion value,
    wherein the bit cost value R(v,p,C) is determined by:
        computing a baseline bit cost value $R_0(v,p)$ that represents a bit cost for encoding a difference vector d=v−p;
        computing a bias value ΔR(v,C) based on a bias function ΔR that has a local minimum at each of the vectors $c_1$, $c_2$, ..., $c_n$, wherein the bias function ΔR approaches zero as the difference vector d approaches zero; and
        adding the baseline bit cost value $R_0(v,p)$ and the bias value ΔR(v,C) to obtain the bit cost value R(v,p,C).

2. The method of claim 1, wherein the rate distortion value J(v) is given by the expression J(v)=D(v)+λR(v,p,C), wherein λ is a positive scalar value.

3. The method of claim 1, wherein said encoding the current frame also includes:
    encoding the difference vector d=v*−p to obtain encoded bits; and
    transmitting the encoded bits through a channel to a decoder.

4. The method of claim 1, wherein the plurality of test vector positions are restricted to a union of a neighborhood of the prediction vector p and neighborhoods of the vectors $c_1$, $c_2$, ..., $c_n$.

5. The method of claim 1, wherein said encoding the current frame also includes computing the vectors $c_1$, $c_2$, ..., $c_n$ by:
    computing a histogram of motion vectors associated with blocks in a nearby frame of the frame sequence;
    identifying the n largest peaks in the histogram; and
    for each of the n largest peaks, determining a location of the peak.

6. The method of claim 1, wherein said encoding the current frame also includes computing the vectors $c_1$, $c_2$, ..., $c_n$ by:
    computing a histogram of previously-computed motion vectors for the blocks of the current frame.

7. The method of claim 1, wherein said ordering of the blocks corresponds to a raster scan of the blocks.

8. A video encoding system for encoding video data including a frame sequence, the video encoding system comprising:
    a processing agent; and
    memory storing program instructions, wherein the program instructions, when executed by the processing agent, cause the processing agent to:
        encode a current frame of the frame sequence with respect to a reference frame of the frame sequence, wherein said encoding the current frame includes sequentially processing a plurality of blocks of the current frame according to an ordering of the blocks, wherein processing a current block includes performing a motion vector search for the current block over a plurality of test vector positions, wherein said performing the motion vector search includes: (a) for each test vector position v of the plurality of test vector positions, computing a rate distortion value J(v) based on a linear combination of a distortion value D(v) and a bit cost value R(v,p,C), wherein the distortion value D(v) represents a measure of distortion of the current block relative to a corresponding block in the reference frame, wherein the corresponding block $B_v$ has a position in the reference frame that is defined by the test vector position v and a position of the current block in the current frame, wherein the bit cost value R(v,p,C) depends on the test vector position v, a prediction vector p for the current block and a set C of one or more vectors $c_1$, $c_2$, ..., $c_n$, wherein the one or more vectors $c_1$, $c_2$, ..., $c_n$ are estimates of statistically popular motion vectors for the current frame; and (b) select a test vector position v* from said plurality of test vector positions that gives a minimum rate-distortion value, wherein the bit cost value R(v,p,C) is determined by:
computing a baseline bit cost value $R_0$(v,p) that represents a bit cost for encoding a difference vector d=v−p;
computing a bias value ΔR(v,C) based on a bias function ΔR that has a local minimum at each of the vectors $c_1, c_2, \ldots, c_n$, wherein the bias function ΔR is identically zero in a neighborhood of the prediction vector p; and
adding the baseline bit cost value $R_0$(v,p) and the bias value ΔR(v,C) to obtain the bit cost value R(v,p,C).

9. The video encoding system of claim 8, wherein said encoding the current frame also includes encoding the difference vector d=v*−p to obtain encoded bits, wherein the video encoding system further comprises a transmitter configured to transmit the encoded bits through a channel to a decoder.

10. A non-transitory computer-readable memory medium for encoding video data including a frame sequence, wherein the memory medium stores program instructions that are executable by a computer, wherein the program instructions, when executed by the computer, cause the computer to:
encode a current frame of the frame sequence with respect to a reference frame of the frame sequence, wherein said encoding the current frame includes sequentially processing a plurality of blocks of the current frame according to an ordering of the blocks, wherein processing a current block includes performing a motion vector search for the current block over a plurality of test vector positions, wherein said performing the motion vector search includes:
for each test vector position v of the plurality of test vector positions, computing a rate distortion value J(v) based on a linear combination of a distortion value D(v) and a bit cost value R(v,p,C), wherein the distortion value D(v) represents a measure of distortion of the current block relative to a corresponding block in the reference frame, wherein the corresponding block $B_v$ has a position in the reference frame that is defined by the test vector position v and a position of the current block in the current frame, wherein the bit cost value R(v,p,C) depends on the test vector position v, a prediction vector p for the current block and a set C of one or more vectors $c_1$, $c_2$, ..., $c_n$, wherein the one or more vectors $c_1$, $c_2$, ..., $c_n$ are estimates of statistically popular motion vectors for the current frame;
selecting a test vector position v* from said plurality of test vector positions that gives a minimum rate-distortion value,
wherein the bit cost value R(v,p,C) is determined by:
computing a baseline bit cost value $R_0$(v,p) that represents a bit cost for encoding a difference vector d=v−p;
computing a bias value ΔR(v,C) based on a bias function ΔR that has a local minimum at each of the vectors $c_1, c_2, \ldots, c_n$, wherein the bias function ΔR is identically zero in a neighborhood of the prediction vector p; and
adding the baseline bit cost value $R_0$(v,p) and the bias value ΔR(v,C) to obtain the bit cost value R(v,p,C).

11. A non-transitory computer-readable memory medium for encoding video data including a frame sequence, wherein the memory medium stores program instructions that are executable by a computer, wherein the program instructions, when executed by the computer, cause the computer to:
encode a current frame of the frame sequence with respect to a reference frame of the frame sequence, wherein said encoding the current frame includes sequentially processing a plurality of blocks of the current frame according to an ordering of the blocks, wherein processing a current block includes performing a motion vector search for the current block over a plurality of test vector positions, wherein said performing the motion vector search includes:
for each test vector position v of the plurality of test vector positions, computing a rate distortion value J(v) based on a linear combination of a distortion value D(v) and a bit cost value R(v,p,C), wherein the distortion value D(v) represents a measure of distortion of the current block relative to a corresponding block in the reference frame, wherein the corresponding block $B_v$ has a position in the reference frame that is defined by the test vector position v and a position of the current block in the current frame, wherein the bit cost value R(v,p,C) depends on the test vector position v, a prediction vector p for the current block and a set C of one or more vectors $c_1$, $c_2$, ..., $c_n$, wherein the one or more vectors $c_1$, $c_2$, ..., $c_n$ are estimates of statistically popular motion vectors for the current frame;
selecting a test vector position v* from said plurality of test vector positions that gives a minimum rate-distortion value,
wherein n equals one, wherein the bit cost value R(v,p,C) is determined by computing a minimum of a first value and a second value, wherein the first value is determined by evaluating a standard rate function $R_0$ at the vector v, wherein the standard rate function $R_0$ has a minimum at the prediction vector p, wherein the second value is determined by evaluating a function $R_1$ at the vector v, wherein the function $R_1$ has a minimum at the vector $c_1$, wherein a minimum value of the function $R_1$ is greater than a minimum value of the standard rate function $R_0$.

12. A method for encoding video data including a frame sequence, the method comprising:
encoding a current frame of the frame sequence with respect to a reference frame of the frame sequence, wherein said encoding the current frame includes sequentially processing a plurality of blocks of the current frame according to an ordering of the blocks, wherein processing a current block includes performing a motion vector search for the current block over a plurality of test vector positions, wherein said performing the motion vector search includes:
for each test vector position v of the plurality of test vector positions, computing a rate distortion value J(v) based on a linear combination of a distortion value D(v) and a bit cost value R(v,p,C), wherein the distortion value D(v) represents a measure of distortion of the current block relative to a corresponding block $B_v$ in the reference frame, wherein the corresponding block $B_v$ has a position in the reference frame that is defined by the test vector position v and a position of the current block in the current frame, wherein the bit cost value R(v,p,C) depends on the test vector position v, a prediction vector p for the current block and a set C of one or more vectors $c_1$, $c_2$, ..., $c_n$, wherein the vectors $c_1$, $c_2$, ..., $c_n$ are estimates of statistically popular motion vectors for the current frame;

selecting a test vector position v* from said plurality of test vector positions that gives a minimum rate-distortion value, wherein n equals one, wherein the bit cost value R(v,p,C) is determined by:

computing a baseline bit cost value $R_0(v,p)$ that represents a bit cost for encoding a difference vector d=v−p; and computing a minimum of the baseline bit cost value $R_0(v,p)$ and a predetermined constant value, wherein the minimum is the bit cost value R(v,p,C).

13. A method for encoding video data including a frame sequence, the method comprising:

encoding a current frame of the frame sequence with respect to a reference frame of the frame sequence, wherein said encoding the current frame includes sequentially processing a plurality of blocks of the current frame according to an ordering of the blocks, wherein processing a current block includes performing a motion vector search for the current block over a plurality of test vector positions, wherein said performing the motion vector search includes:

for each test vector position v of the plurality of test vector positions, computing a rate distortion value J(v) based on a linear combination of a distortion value D(v) and a bit cost value R(v,p,C), wherein the distortion value D(v) represents a measure of distortion of the current block relative to a corresponding block $B_v$ in the reference frame, wherein the corresponding block $B_v$ has a position in the reference frame that is defined by the test vector position v and a position of the current block in the current frame, wherein the bit cost value R(v,p,C) depends on the test vector position v, a prediction vector p for the current block and a set C of one or more vectors $c_1$, $c_2$, ..., $c_n$, wherein the vectors $c_1$, $c_2$, ..., $c_n$ are estimates of statistically popular motion vectors for the current frame;

selecting a test vector position v* from said plurality of test vector positions that gives a minimum rate-distortion value, wherein n equals one, wherein the bit cost value R(v,p,C) is determined by computing a minimum of a first value and a second value, wherein the first value is determined by evaluating a standard rate function $R_0$ at the vector v, wherein the standard rate function $R_0$ has a minimum at the prediction vector p, wherein the second value is determined by evaluating a function $R_1$ at the vector v, wherein the function $R_1$ has a minimum at the vector $c_1$, wherein a minimum value of the function $R_1$ is greater than a minimum value of the standard rate function $R_0$.

14. A method for encoding video data including a frame sequence, the method comprising:

encoding a current frame of the frame sequence with respect to a reference frame of the frame sequence, wherein said encoding the current frame includes sequentially processing a plurality of blocks of the current frame according to an ordering of the blocks, wherein processing a current block includes performing a motion vector search for the current block over a plurality of test vector positions, wherein said performing the motion vector search includes:

for each test vector position v of the plurality of test vector positions, computing a rate distortion value J(v) based on a linear combination of a distortion value D(v) and a bit cost value R(v,p,C), wherein the distortion value D(v) represents a measure of distortion of the current block relative to a corresponding block $B_v$ in the reference frame, wherein the corresponding block $B_v$ has a position in the reference frame that is defined by the test vector position v and a position of the current block in the current frame, wherein the bit cost value R(v,p,C) depends on the test vector position v, a prediction vector p for the current block and a set C of one or more vectors $c_1$, $c_2$, ..., $c_n$, wherein the vectors $c_1$, $c_2$, ..., $c_n$ are estimates of statistically popular motion vectors for the current frame;

selecting a test vector position v* from said plurality of test vector positions that gives a minimum rate-distortion value, encoding a second frame of the frame sequence with respect to m reference frames of the frame sequence, wherein m is greater than one, wherein said encoding the second frame includes sequentially processing a plurality of blocks of the second frame according to an ordering of the blocks, wherein processing a given block of the second frame includes performing a motion vector search for the block over a search space of m-tuples $(v_1, v_2, ..., v_m)$, wherein each vector $v_k$, k=1, 2, ..., m, of the m-tuple $(v_1, v_2, ..., v_m)$ is a candidate motion vector for the block with respect to a $k^{th}$ one of the reference frames:

for each m-tuple of the search space, computing a bit cost value $R(v_k,p,E)$ for each vector $v_k$ in the m-tuple, wherein the bit cost value $R(v_k,p,E)$ depends on vector $v_k$, a prediction vector p for the block, and a vector set E, wherein the vector set E includes one or more vectors from a set of vectors $\{e_1, e_2, ..., e_L\}$, wherein the vectors $e_1, e_2, ..., e_L$ are estimates of the L most statistically-popular motion vectors of the second frame.

15. A method for encoding video data including a frame sequence, the method comprising:

encoding a current frame of the frame sequence with respect to a reference frame of the frame sequence, wherein said encoding the current frame includes sequentially processing a plurality of blocks of the current frame according to an ordering of the blocks, wherein processing a current block includes performing a motion vector search for the current block over a plurality of test vector positions, wherein said performing the motion vector search includes:

for each test vector position v of the plurality of test vector positions, computing a rate distortion value J(v) based on a linear combination of a distortion value D(v) and a bit cost value R(v,p,C), wherein the distortion value D(v) represents a measure of distortion of the current block relative to a corresponding block $B_v$ in the reference frame, wherein the corresponding block $B_v$ has a position in the reference frame that is defined by the test vector position v and a position of the current block in the current frame, wherein the bit cost value R(v,p,C) depends on the test vector position v, a prediction vector p for the current block and a set C of one or more vectors $c_1$, $c_2, \ldots, c_n$, wherein the vectors $c_1, c_2, \ldots, c_n$ are estimates of statistically popular motion vectors for the current frame;

selecting a test vector position v* from said plurality of test vector positions that gives a minimum rate-distortion value, encoding a second frame of the frame sequence with respect to in reference frames of the frame sequence, wherein in is greater than one, wherein said encoding the second frame includes sequentially processing a plurality of blocks of the second frame according to an ordering of those blocks, wherein processing a given block of the second frame includes performing a motion vector search for the block over a search space of m-tuples $(v_1, v_2, \ldots, v_m)$, wherein each vector $v_k$, $k=1, 2, \ldots, m$, of the m-tuple $(v_1, v_2, \ldots, v_m)$ is a candidate motion vector for the block with respect to a $k^{th}$ one of the reference frames, wherein the motion vector search includes:

for each m-tuple of the search space, (a) computing a rate distortion value $J(v_k)=D_k(v_k)+\lambda R(v_k,p,E)$ for each vector $v_k$ in the m-tuple, wherein $D_k(v_k)$ is a distortion value of the block based on the 10 reference frame and the vector $v_k$, wherein $R(v_k,p,E)$ is a bit cost value that depends on vector $v_k$, a prediction vector p for the block, and a vector set E, wherein the vector set E includes one or more vectors from a set of vectors $\{e_1, e_2, \ldots, e_L\}$, wherein the vectors $e_1, e_2, \ldots, e_L$ are estimates of the L most statistically-popular motion vectors of the second frame, wherein L is greater than or equal to one, and (b) determining the index $k_{min}$ of the vector $v_{kmin}$ in the m-tuple that gives the minimum value M of the distortion values $J(v_k)$;

determining an m-tuple T* of the search space that gives a minimum value M* of M, wherein the vector $v_{kmin}$ corresponding to the m-tuple T* is selected as a motion vector for the block.

16. The method of claim 15, wherein said processing the block includes:

encoding a difference between the selected motion vector for the block and the prediction vector p for the block to obtain output bits; and transmitting the output bits to a video decoder via a communication medium.

17. A video encoding system for encoding video data including a frame sequence, the video encoding system comprising:

a processing agent; and memory storing program instructions, wherein the program instructions, when executed by the processing agent, cause the processing agent to:

encode a current frame of the frame sequence with respect to a reference frame of the frame sequence, wherein said encoding the current frame includes sequentially processing a plurality of blocks of the current frame according to an ordering of the blocks, wherein processing a current block includes performing a motion vector search for the current block over a plurality of test vector positions, wherein said performing the motion vector search includes: (a) for each test vector position v of the plurality of test vector positions, computing a rate distortion value J(v) based on a linear combination of a distortion value D(v) and a bit cost value R(v,p,C), wherein the distortion value D(v) represents a measure of distortion of the current block relative to a corresponding block in the reference frame, wherein the corresponding block $B_v$ has a position in the reference frame that is defined by the test vector position v and a position of the current block in the current frame, wherein the bit cost value R(v,p,C) depends on the test vector position v, a prediction vector p for the current block and a set C of one or more vectors $c_1$, $c_2, \ldots, c_n$, wherein the one or more vectors $c_1$, $c_2, \ldots, c_n$ are estimates of statistically popular motion vectors for the current frame; and (b) select a test vector position v* from said plurality of test vector positions that gives a minimum rate-distortion value, wherein n equals one, wherein the bit cost value R(v,p,C) is determined by computing a minimum of a first value and a second value, wherein the first value is determined by evaluating a standard rate function $R_0$ at the vector v, wherein the standard rate function $R_0$ has a minimum at the prediction vector p, wherein the second value is determined by evaluating a function $R_1$ at the vector v, wherein the function $R_1$ has a minimum at the vector $c_1$, wherein a minimum value of the function $R_1$ is greater than a minimum value of the standard rate function $R_0$.

* * * * *

UNITED STATES PATENT AND TRADEMARK OFFICE
CERTIFICATE OF CORRECTION

| | |
|---|---|
| PATENT NO. | : 9,438,928 B2 |
| APPLICATION NO. | : 13/957269 |
| DATED | : September 6, 2016 |
| INVENTOR(S) | : John C. Sievers |

Page 1 of 1

It is certified that error appears in the above-identified patent and that said Letters Patent is hereby corrected as shown below:

IN THE CLAIMS:

COLUMN 24, Line 9 (Claim 1), please delete "AR" and substitute -- $\Delta R$ --.

COLUMN 28, Line 27 (Claim 14), please delete "wherein in" and substitute -- wherein m --.

COLUMN 29, Line 10 (Claim 15), please delete "respect to in reference frames" and substitute -- respect to m reference frames --.

COLUMN 29, Line 11 (Claim 15), please delete "wherein in is greater than one," and substitute -- wherein m is greater than one, --.

COLUMN 29, Line 25 (Claim 15), please delete "10" and substitute -- kth --.

Signed and Sealed this
Eighth Day of November, 2016

Michelle K. Lee
*Director of the United States Patent and Trademark Office*